(12) United States Patent
Ruckenstein et al.

(10) Patent No.: US 7,445,160 B2
(45) Date of Patent: Nov. 4, 2008

(54) POSITION LOCATION USING ERROR CORRECTION

(75) Inventors: Gitit Ruckenstein, Palo Alto, CA (US); Doron Shaked, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/453,368

(22) Filed: Jun. 14, 2006

(65) Prior Publication Data

US 2007/0290041 A1     Dec. 20, 2007

(51) Int. Cl.
*G06K 19/06* (2006.01)
(52) U.S. Cl. .................. 235/494; 382/119; 714/808
(58) Field of Classification Search ..................
235/462.08–462.09, 462.49, 494; 382/119; 714/808
See application file for complete search history.

(56) References Cited

U.S. PATENT DOCUMENTS

| | | | |
|---|---|---|---|
| 5,221,833 A | 6/1993 | Hecht | |
| 5,442,147 A | 8/1995 | Burns et al. | |
| 5,937,110 A | 8/1999 | Petrie et al. | |
| 6,186,405 B1 * | 2/2001 | Yoshioka | 235/494 |
| 6,327,395 B1 | 12/2001 | Hecht et al. | |
| 6,548,768 B1 | 4/2003 | Pettersson et al. | |
| 2002/0050982 A1 * | 5/2002 | Ericson | 345/173 |
| 2003/0056169 A1 * | 3/2003 | Lapstun et al. | 714/808 |
| 2003/0117652 A1 * | 6/2003 | Lapstun | 358/1.18 |
| 2006/0034496 A1 * | 2/2006 | Silverbrook et al. | 382/119 |

FOREIGN PATENT DOCUMENTS

| | | | |
|---|---|---|---|
| WO | WO 01/26033 A1 * | 4/2001 | |
| WO | WO 01/75781 A1 | 10/2001 | |

* cited by examiner

*Primary Examiner*—Daniel A Hess (57) ABSTRACT

Provided are codes that may be applied to a sheet of paper or other surface, as well as techniques for decoding such codes. Using such codes and decoding techniques permits identification of the position of a pen (e.g., a digital pen) on the paper or other surface, by observing only a small field of the surface. Moreover, the position often can be identified even in the presence of arbitrary rotation and certain errors (e.g., due to dust or stray markings on the paper).

20 Claims, 8 Drawing Sheets

| | 121 | | | | 122 | | | | |
|---|---|---|---|---|---|---|---|---|---|
| N0 | N1 | N2 | X0 | X3 | N0 | N1 | N2 | X0 | X3 |
| N3 | N4 | R | X1 | X4 | N3 | N4 | R | X1 | X4 |
| N5 | N6 | R | R | X5 | N5 | N6 | R | R | X5 |
| Y0 | R | Y1 | X2 | X6 | Y0 | R | Y1 | X2 | X6 |
| Y2 | Y3 | Y4 | Y5 | Y6 | Y2 | Y3 | Y4 | Y5 | Y6 |
| N0 | N1 | N2 | X0 | X3 | N0 | N1 | N2 | X0 | X3 |
| N3 | N4 | R | X1 | X4 | N3 | N4 | R | X1 | X4 |
| N5 | N6 | R | R | X5 | N5 | N6 | R | R | X5 |
| Y0 | R | Y1 | X2 | X6 | Y0 | R | Y1 | X2 | X6 |
| Y2 | Y3 | Y4 | Y5 | Y6 | Y2 | Y3 | Y4 | Y5 | Y6 |

| A11 | A12 | A13 | A15 | A15 |
|-----|-----|-----|-----|-----|
| A21 | A22 | A23 | A24 | A25 |
| A31 | A32 | A33 | A34 | A35 |
| A41 | A42 | A43 | A44 | A45 |
| A51 | A52 | A53 | A54 | A55 |

FIG. 11B

| A34 | A35 | A31 |     |     |
|-----|-----|-----|-----|-----|
| A44 | A45 | R   |     |     |
| A54 | A55 | R   | R   |     |
|     | R   | A11 | A12 | A13 |
|     |     | A21 | A22 | A23 |

FIG. 10C

| A11 | A12 | A13 | A15 | A15 |
|-----|-----|-----|-----|-----|
| A21 | A22 | A23 | A24 | A25 |
| A31 | A32 | A33 | A34 | A35 |
| A41 | A42 | A43 | A44 | A45 |
| A51 | A52 | A53 | A54 | A55 |

FIG. 11C

| A34 | A35 | A31 | A32 | A33 |
|-----|-----|-----|-----|-----|
| A44 | A45 | R   | A42 | A43 |
| A54 | A55 | R   | R   | A53 |
|     | R   | A11 | A12 | A13 |
|     |     | A21 | A22 | A23 |

|   |   |   |   |   |
|---|---|---|---|---|
| 0 | 0 | 0 | 0 | 0 |
| 0 | 0 | 1 | 0 | 0 |
| 0 | 0 | 1 | 1 | 0 |
| 0 | 1 | 0 | 0 | 0 |
| 0 | 0 | 0 | 0 | 0 |

POSITION LOCATION USING ERROR CORRECTION

FIELD OF THE INVENTION

The present invention pertains to the identification of a position on a sheet of paper or other substrate that has been encoded with position-location information, based on knowledge of the position-location information within only a small field of view. The present invention may be applied, e.g., to position location in the context of a digital pen.

BACKGROUND

Generally speaking, a digital pen is a pen that is capable of writing on paper in ink, in the same manner as an ordinary pen, and in addition is capable of digitizing and then transferring or internally storing any marks made by such pen. Most of such digital pens utilize a miniature camera for detecting preprinted patterns made on the paper. By using paper with appropriately preprinted patterns and the proper decoding software, such a digital pen generally can identify the individual piece of paper, either uniquely or as a member of a particular set, on which marks are made and can distinguish where on the paper each mark is made. As a result, the digital pen can be used as a computer-input device. One example of a digital pen is the Hewlett-Packard Digital Pen, which stores pen strokes internally and then, upon being inserted into a cradle, downloads the digitized marks into a computer.

One way of marking paper with position-location information is described in U.S. Pat. No. 6,548,768 (the '768 Patent), which is incorporated by reference herein as though set forth herein in full.

SUMMARY OF THE INVENTION

According to one aspect, the present invention improves upon existing encoding techniques by providing certain codes that permit identification of the position even in the presence of arbitrary rotation, offset and certain errors (e.g., due to dust or stray markings on the paper).

The foregoing summary is intended merely to provide a brief description of the general nature of the invention. A more complete understanding of the invention can be obtained by referring to the claims and the following detailed description of the preferred embodiments in connection with the accompanying figures.

DESCRIPTION OF THE PREFERRED EMBODIMENT(S)

The present invention addresses the practical problem of designing a two-dimensional position-location coding pattern. Such a coding pattern may be used in the context of a navigation system composed of a large printed surface and a detection device. The position-location coding pattern defines the special pattern printed on the surface. The detection device provides reasonably good images of small regions on the surface. The limited region captured by the detection device is referred to herein as the field of view (FOV). The information captured within the FOV pattern is used to determine the absolute position on the large surface.

The invention is particularly applicable to the recently developed system of the digital pen and paper. In this setting, a special pattern is printed in advance on the paper. The pen contains a small camera that repeatedly takes pictures of the paper simultaneously with writing. The position data resolved from these pictures allows the system to generate a digital image representing the written document.

While position-location encoding is not new, the present invention's approach offers certain advantages. In representative embodiments of the present invention, the orientation of the camera axis relative to the paper can be arbitrary. In other words, the position location in such embodiments is invariant to FOV-orientation rotation. In addition, certain embodiments are capable of correctly identifying the position even where some position-location coding symbols are wrongly detected by the image-processing module. Such detection errors may occur, for example, because of print errors, document wear, dust, or difficult camera angles.

In the exemplary embodiment described below, we present a position-location coding technique defined over an alphabet of nine coding symbols. The technique covers a surface of $5 \times 5 \times 2^{45}$ positions and allows position location using a $5 \times 5$ position FOV. In this embodiment, correct position location is possible under rotation, as well as in the presence of some errors.

The preferred embodiment is based on dividing the surface into non-overlapping regions with the same dimensions as the FOV. Each region is assigned three different numbers that provide the position information. The three numbers represent a page number, a row number, and a column number. The numbers need not correspond to the physical coordinates, but in the preferred embodiments any two adjacent regions in a row (column) have the same page number, the same row (column) number, and consecutive column (row) numbers. However, the techniques described below will work under more general circumstances, e.g., if any two adjacent regions in a row (column) have the same page number, the same row (column) number, and column (row) numbers that can be determined based on the column (row) number of the other.

In the embodiments described below, the page number, row number, and column number are explicitly written in predefined locations inside each region using the coding alphabet. Also, in the described embodiments, other locations within each region hold parity (or other error-correction) information corresponding to the position information. As discussed in more detail below, these parities (or other error-correction coding symbols or information) allow the correction of certain coding-symbol-identification errors.

The remaining locations inside each region serve as a registration pattern, resolving the pattern orientation in addition to marking the boundaries between different regions. As the camera's FOV often covers parts of different regions, the registration pattern indicates which coding symbols belong to different regions in the FOV. As the position information is given by explicit numbers for page, row and column, it is rather straightforward to decode the position out of FOV coding symbols corresponding to different regions. In the preferred embodiments, the registration pattern is such that identification of the registration pattern within a given possibly rotated FOV is possible even if one of the registration coding symbols is corrupted. This provides for a one-coding-symbol-error correction capability for the registration coding symbols as well.

Figure 1:
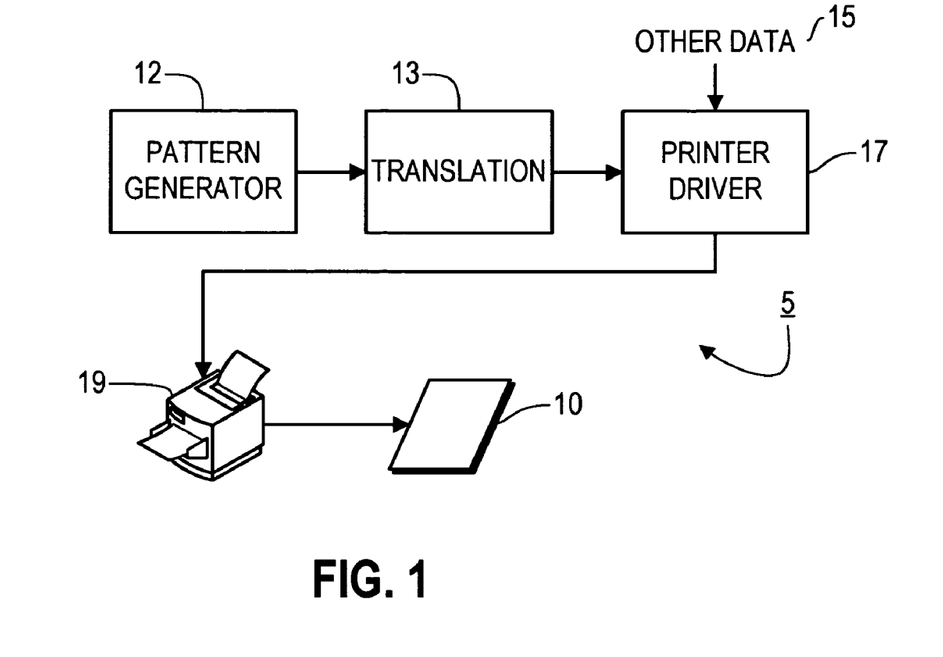
FIG. 1 is a block diagram of a system for generating encoded paper according to a representative embodiment of the present invention.

As noted above, the present invention is particularly applicable in the context of a digital pen and specially encoded paper. A system 5 for generating such paper 10 is illustrated in FIG. 1. Initially, a coding pattern is generated in module 12. This pattern uniquely identifies the locations of individual regions across the entire sheet of paper, e.g., so that each region contains position coding symbols or other information sufficient to identify its position, including the particular page (e.g., by page number). The regions preferably are contiguous, non-overlapping and cover the entire page. More detail with regard to the patterns according to the present invention is set forth below.

Translation module 13 then translates the specified pattern of position coding symbols into a pattern of marks that can be printed on paper in a manner that will not unduly interfere with the use of the paper for other purposes, i.e., so that the paper can be used in the same manner as any other paper. One example is the patterning described in the '768 Patent, in which individual coding symbols are represented by different distances from a reference nominal position, based on a virtual raster. The result of such patterning, provided that the virtual raster has a sufficiently small pitch, is a more or less uniformly gray background.

To the patterning data output by module 13, additional data 15 may be added and combined in printer driver 17. For example, such additional data might include vector or raster data for printing a form. The printer driver 17 then provides the combined data to printer 19, which prints any such additional data 15, together with the background patterning data, thereby providing encoded paper 10. It should be noted that additional data 15 may be omitted, e.g., where the encoded paper 10 is to be used as blank note paper.

Figure 2:
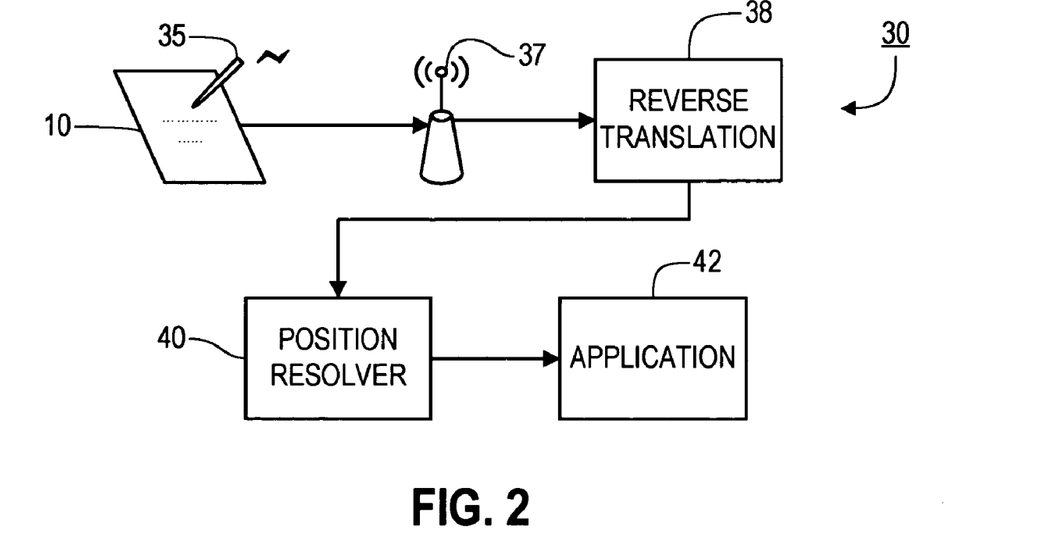
FIG. 2 is a block diagram of a system for using encoded paper according to a representative embodiment of the present invention.

FIG. 2 illustrates a system 34 using encoded paper 10. In the present example, a digital pen 35 is used to write on paper 10, with the intent of recording the markings made by a user of pen 35. However, in alternate examples, any other type of device that has the ability to capture image data off of paper 10 instead is used. For example, it might be desired to capture information about where a presenter was pointing on a sheet of paper, in which case the image-capturing device need not have any writing ability.

In the present embodiment, the image data captured by digital pen 35 is transferred wirelessly (e.g., using a Bluetooth or 802.11 protocol) in real time via a receiver 37. In other embodiments, it is transferred real time via a hard-wired connection, and in still others it is stored in pen 35 and later transferred, e.g., by dropping pen 35 into a cradle.

In any event, in module 38 the image data (typically after any necessary rotation) are converted back into position coding symbols, which are used in module 40 to identify the position of the pen 35 on the paper 10. Such information, together with the stored writing information, then is provided to the appropriate application 42. For example, if the paper 10 included a pre-printed form and the user checked a box on the form, then based on the detected position information, the application 42 can determine which box was checked and perform any associated processing based on that action.

Thus, the use of encoded paper 10 together with a digital pen 35 (or other imaging device) allows a user to simply mark on a piece of paper in order to trigger performance of automated tasks. Unfortunately, conventional encoded paper and decoding techniques are not adequately resistant to errors, such as may be caused by dust or other stray markings on the paper 10, particularly when using a field of view that is as small as is permitted by the present invention.

Figure 3:
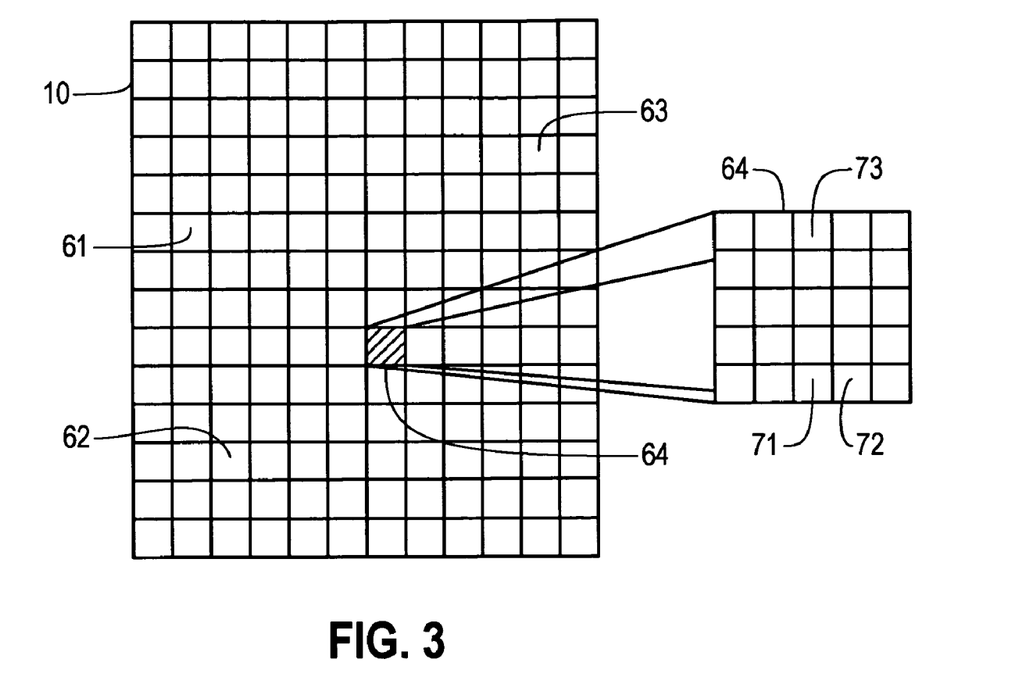
FIG. 3 illustrates a sheet of paper that has been divided into regions according to a representative embodiment of the present invention.

FIG. 3 illustrates a sheet of paper 10 that has been divided into regions (e.g., regions 61-64). In the present embodiment of the invention, each region is square, and the regions are laid out in an array, are contiguous with each other, are non-overlapping and cover the entire page 10. Also, in the present embodiment each region contains an array of coding symbols (e.g., in positions 71-73, shown for region 64), here an array of 5×5 coding symbols, or 25 coding symbols total. As described in more detail below, the coding symbols in each region identify the page number, the row number and the column number for the region. Thus, in the present example, the row number for a region is one higher than the row number for the region immediately above it, and the column number for a region is one higher than the region immediately to the left of it.

It should be noted that the following discussion mainly focuses on the code representation of the printed pattern, rather than the printed-pattern representation. That is, the translation from printed marks to position coding symbols and registration coding symbols (discussed below) generally is deemed already to have been completed. This is because the present invention is largely independent of the specific printed marks used to represent position and registration coding symbols. In the present example, it is assumed that each position in the pattern can take any one of nine different values, {0, 1, . . . , 8}, due to the way that the corresponding printed symbol pattern is constructed.

Figure 4:
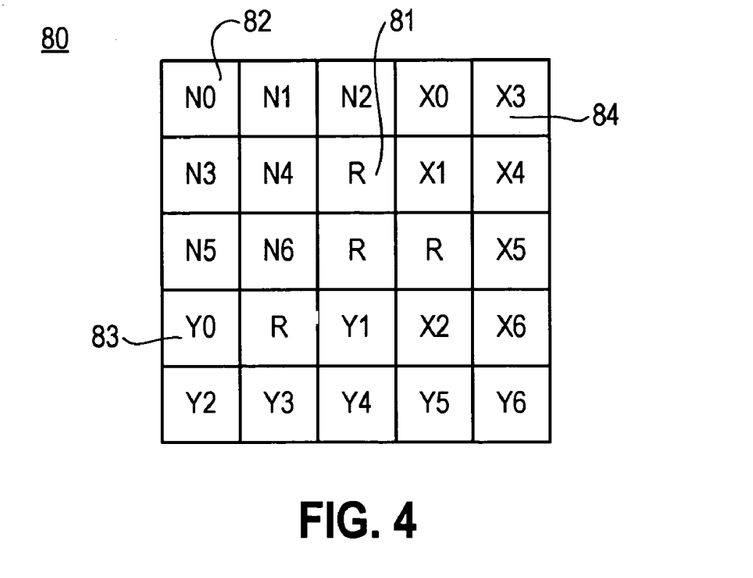
FIG. 4 illustrates the encoding pattern for a single region on a page, according to a representative embodiment of the present invention.

In this regard, FIG. 4 illustrates the encoding pattern (e.g., the pattern generated by module 12) for a single region 80, according to a representative embodiment of the invention. In this embodiment, each region on the page 10 is identically encoded, but with the position information specific to that region. Included within the encoding pattern are a number of registration coding symbols (e.g., coding symbol 81), page position coding symbols (e.g., coding symbol 82), row position coding symbols (e.g., coding symbol 83), and column position coding symbols (e.g., coding symbol 84), designated by the letters R, N, Y, and X, respectively, in FIG. 4.

The registration pattern (consisting of the R coding symbols) marks the region boundaries and occupies four internal fixed positions within each region. We reserve a value for the registration locations. This value will be written into these four internal fixed locations and nowhere else in the region. The remaining eight values are used to encode the position information itself. For convenience, we denote the registration coding symbol by the digit 8 and the information coding symbols by the octal digits $\{0, 1, \ldots, 7\}$.

The printed symbol associated with the registration coding symbol value 8 preferably is rotation invariant. For example, if the coding symbol values are associated with different dot displacements (as in the '768 Patent), then the registration coding symbol value preferably is associated with the central displacement.

Fifteen internal locations within every region are used to encode the region's absolute position on the paper. The eight values $\{0, 1, \ldots, 7\}$ are allowed in these locations, providing three bits per coding symbol. Forty-five bits are thus available in every region for the position information. In the present embodiment, we separate this information into three numbers, each occupying a five-element vector, namely fifteen bits in total. In the present embodiment, the three numbers correspond to the page number, the row number and the column number. More specifically, in the present embodiment each of the row number and the column number occupy at most fifteen bits. If the maximum number occupies fewer bits, then the row (column) number is written into the least significant bits of the corresponding vector, with the remaining bits of the vector holding a portion of the page number.

The remaining six locations (6=25−4−3×5) in every region preferably hold parity values (or other error-correction coding symbols) that provide protection against errors in the position information. Two such error-correction coding symbols are associated with each of the 5-coding-symbol vectors, creating a 7-coding-symbol codeword of a Reed-Solomon error-correction code. We elaborate on this below.

Thus, the indices in FIG. 4 define the order of coding symbols inside each codeword, where 0 is for the least significant position-information coding symbol, 4 is the most significant position-information coding symbol, and 5 and 6 are the indices of the parity (or other error-correction) coding symbols. The row number occupies the least significant bits of the 15-bit Y data value (Y0-Y4) and the column number occupies the least significant bits of the 15-bit X data value (X0-X4). The page number occupies the 15-bit N data value (N0-N4) and, optionally, also the most significant bits of the 15-bit X and Y data values (Y0-Y4 and X0-X4). N5 and N6 are the error-correction coding symbols for N0-N4, Y5 and Y6 are the error-correction coding symbols for Y0-Y4, and X5 and X6 are the error-correction coding symbols for X0-X4. It is noted that N0-N4 preferably include at least a portion of the page-number information but, as described in more detail below, in certain embodiments of the invention X0-X4 and Y0-Y4 also include information regarding the page number, in addition to including information regarding the row number.

In the present example, a grid unit in the printed pattern (which also corresponds to the size of the space occupied by a single coding symbol) is 0.42333 mm, so the region width and length are each 2.117 mm. An A4 page size is 296 mm×210 mm, and it therefore contains 140×100 non-overlapping regions. Eight bits are required to encode the row number and seven bits are needed for the column number. Thirty bits are therefore left for the page number, so the suggested code can uniquely identify up to $2^{30}$ different pages.

In the preferred embodiment, the 5-coding-symbol (15-bit) X vectors (X0-X4) in two horizontal neighboring regions represent consecutive numbers, and the 5-coding-symbol (15-bit) Y vectors (Y0-Y4) in two vertical neighboring regions represent consecutive numbers. In addition, the 7-symbol X vectors (X0-X6) in two vertical neighboring regions are identical, and the 7-symbol Y vectors (Y0-Y6) in two horizontal neighboring regions are identical.

Comparing FIGS. 3 and 4, it will be appreciated that the pattern shown in FIG. 4 continuously repeats across the entire page 10, with the appropriate row and column numbers encoded into each region, and with the page number being identical within each region on the page 10. Given a large enough FOV, it would be a trivial matter to identify a position on the page 10. Due to physical constraints, however, it generally is preferable to have a FOV that is as small as possible. As will be seen shortly, the technique of the present invention can decode the position if just a single 5×5 field-of-view block can be observed, irrespective of rotation or offset.

Figure 5:
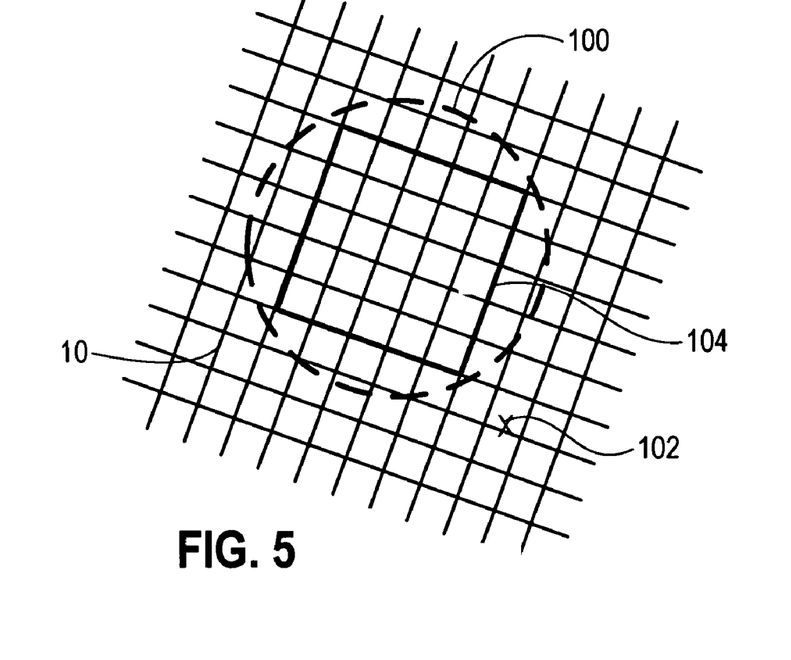
FIG. 5 shows the field of view of a detection device at an arbitrary position and orientation on an encoded page, according to a representative embodiment of the present invention.

From the limited perspective of such a small FOV, the encoded page 10 initially will appear to be an array of coding symbol values, with no clear boundaries between regions. Moreover, the orientation of that array may be arbitrary. The situation is illustrated in FIG. 5, which shows the FOV 100 at an arbitrary position on encoded page 10. In the present embodiment, a digital pen 35 is being used, and position 102 represents the point of pen 35, with FOV 100 being at a known relationship to position 102.

As noted above, the FOV 100 is large enough to encompass a full 5×5 FOV block 104. As shown in FIG. 5, this means that FOV 100 generally should be slightly larger to accommodate different offsets.

At this point, it is possible to rotate the image information within FOV 100 to a potentially correct orientation, based on the virtual raster, which has lines corresponding to the columns and rows of the present embodiment. However, in the present embodiment the virtual raster lines alone can only identify four potential orientations. One arbitrarily is selected, and then the FOV block 104 is identified in a straightforward manner, together with the registration coding symbols within it.

Figure 6:
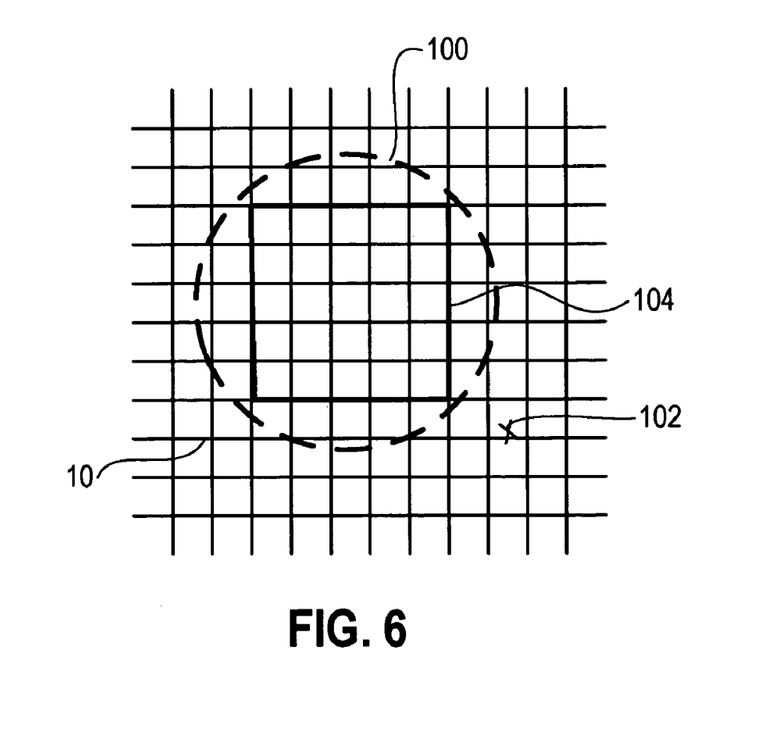
FIG. 6 illustrates a field of view after having been rotated into the correct orientation, according to a representative embodiment of the present invention.

Such registration coding symbols can uniquely identify the correct orientation, as well as the offset of FOV block 104 with respect to surrounding regions on the page 10. In fact, it is noted that any three of the four registration coding symbols (designated "R") in FIG. 4 (or for that matter, any other three non-collinear registration coding symbols) would be sufficient to uniquely identify such orientation and offset. As discussed in more detail below, the additional registration coding symbol of the present embodiment provides a certain amount of error correction. FIG. 6 illustrates FOV 100, together with FOV block 104, after having been rotated into the correct orientation.

Figure 7:
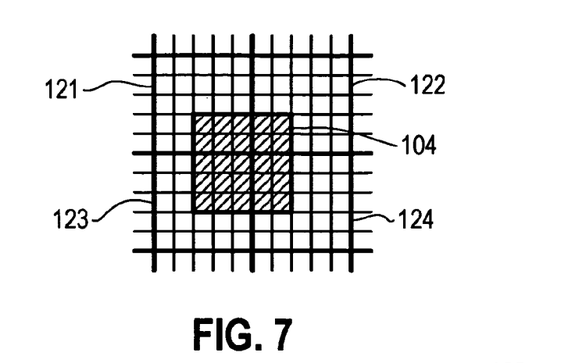
FIG. 7 illustrates a field-of-view block in relation to four regions that it overlaps, according to a representative embodiment of the present invention.

FIG. 7 illustrates FOV block 104 in relation to the four regions 121-124 that it overlaps. As noted above, the offset information indicated by the registration coding symbols provides such relative positioning.

Figure 8:
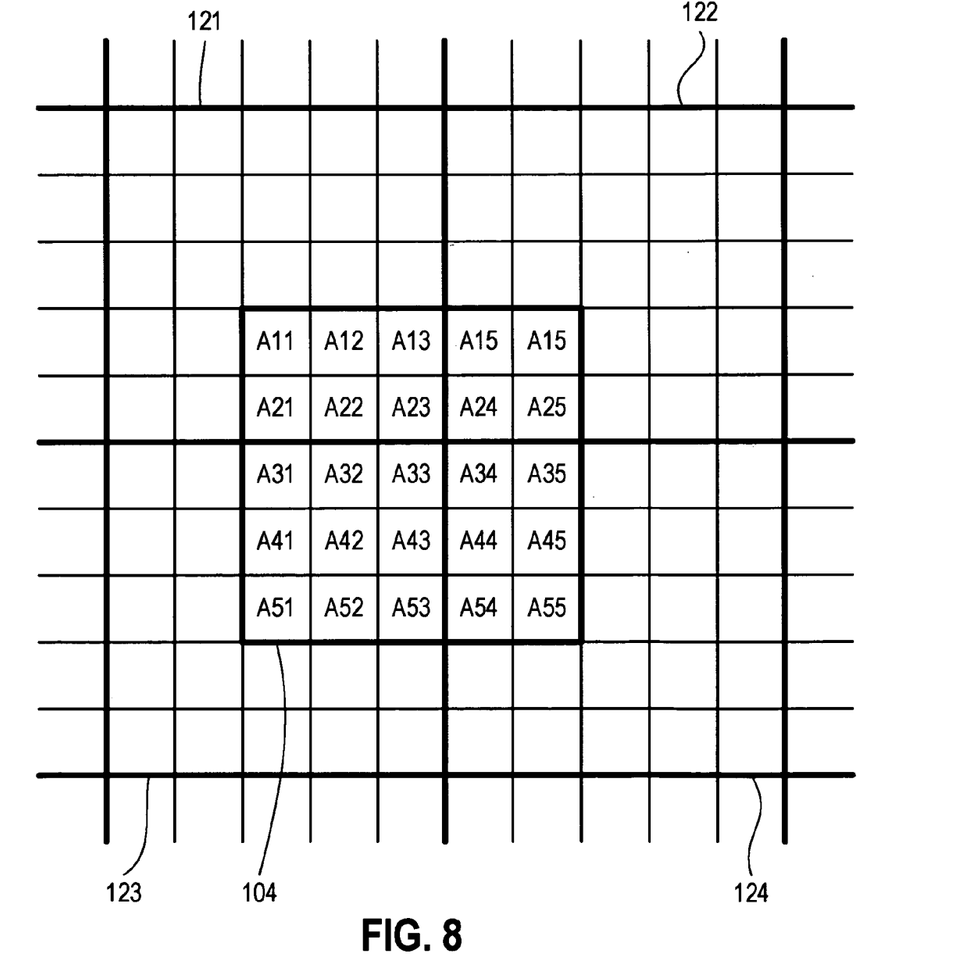
FIG. 8 illustrates a field-of-view block in relation to four regions that it overlaps, with the coding symbols in it displayed, according to a representative embodiment of the present invention.

While each of the regions 121-124 contains the complete information to identify its page number, row number and column number, as shown in FIG. 8, we do not yet have complete information for any one of such regions 121-124. At this point, we only know the coding symbols within FOV block 104.

Figure 9:
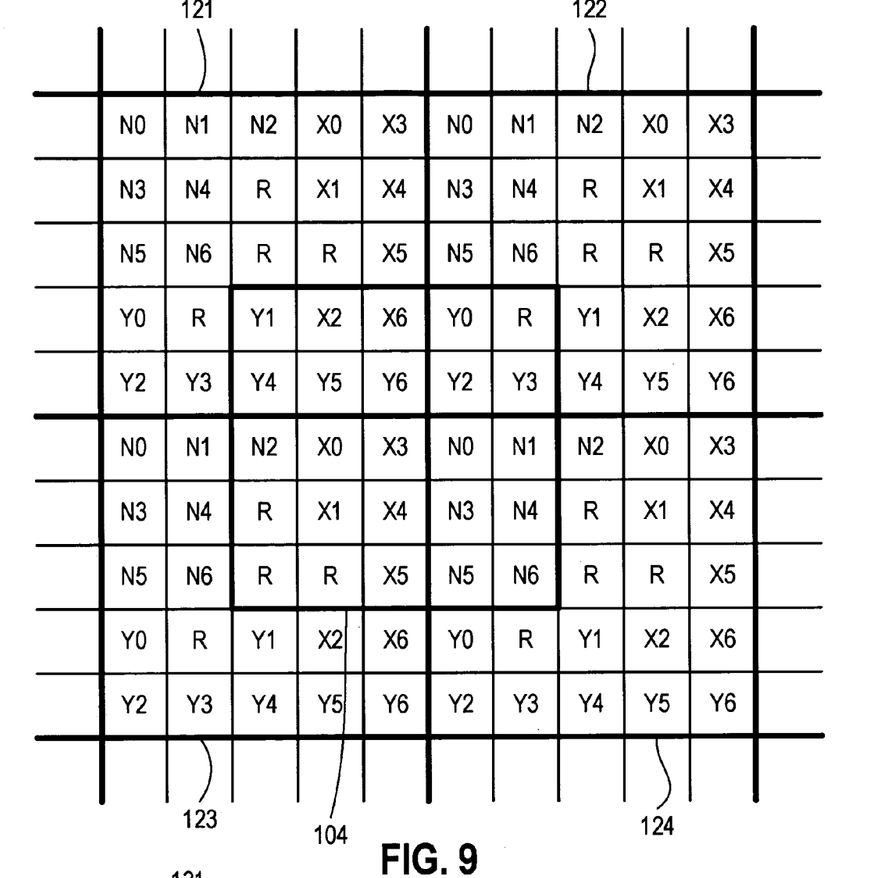
FIG. 9 shows four overlapped regions with their respective coding patterns indicated, overlaid by a field-of-view block, according to a representative embodiment of the present invention.

FIG. 9 shows the four overlapped regions 121-124 with their respective coding patterns indicated. By comparing FIG. 9 to FIG. 8 and keeping in mind the relationships set out above, it is possible to completely fill in the coding symbols for region 121. The progression for doing so is as follows.

Figure 10A:
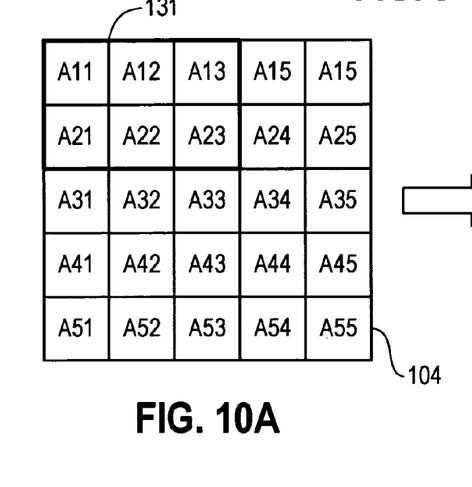
FIGS. 10A-D illustrate a field-of-view block, with different position locations highlighted to show the progression of coding symbols that are copied from it, according to a representative embodiment of the present invention.
Figure 11A:
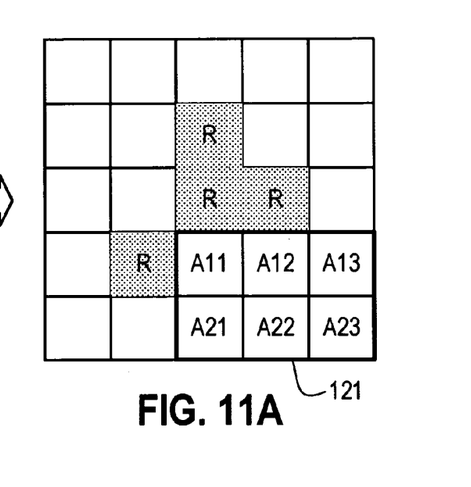
FIGS. 11A-D illustrate a region being reconstructed, highlighting the progression of position locations that are copied into such region, according to a representative embodiment of the present invention.

Initially, comparing FIGS. 9 and 10A, the coding symbols 131 in FOV block 104 already lie in region 121. Accordingly, they are simply copied from FOV block 104 to the appropriate locations in region 121, with the result shown in FIG. 11A. Also, the fixed locations of the registration coding symbols within region 121 are known in advance. Therefore, they also are added into region 121, as indicated in FIG. 11A.

Figure 10B:
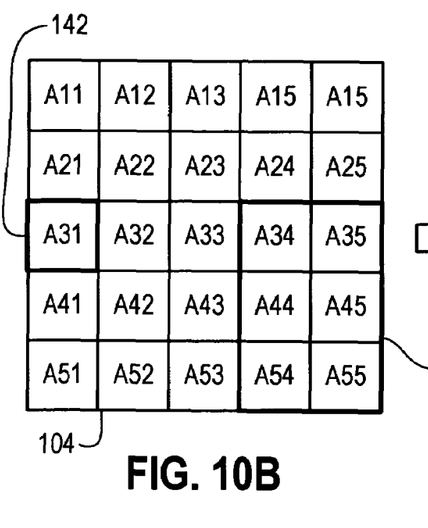
Figure 11B:
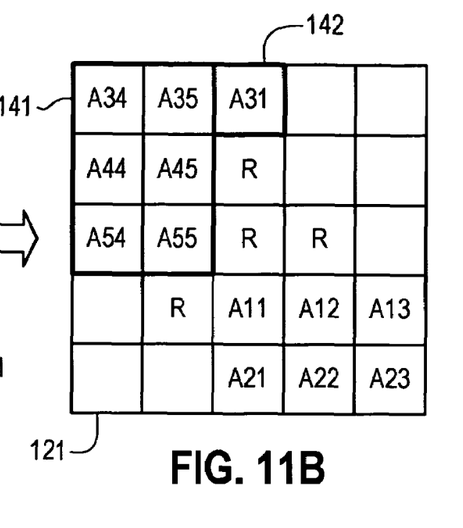

The N0 . . . N6 page number indicators, shown in FIG. 9, are highlighted in FIG. 10B as elements 141 and 142. The page number indicators are identical throughout the page 10. Accordingly, referring again to FIG. 9, page number indicators 141 are copied from region 124 to region 121 and the page number indicator 142 is copied from region 123 to region 121, with the end result being as shown in FIG. 11B.

Figure 10C:
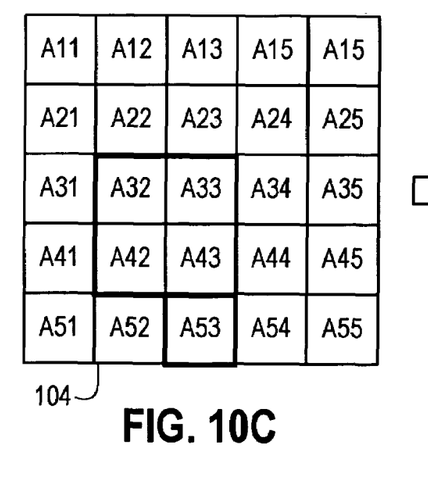
Figure 11C:
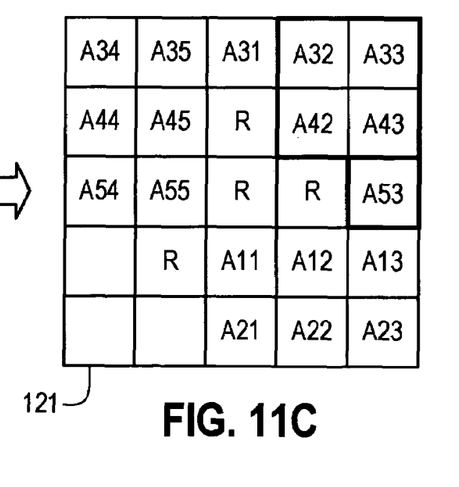

Referring briefly back to FIG. 9, column (X) coding symbols in regions 121 and 123 are identical because these two regions are in the same column. Therefore, we can copy the X coding symbols in region 123 to the corresponding locations in region 121. This is illustrated in FIGS. 10C and 11C. Note that the locations of the error-correction coding symbols X5, X6 in the rightmost column of each region and the fact that we select the upper left overlapped region to fill in the missing coding symbols together mean that the error-correction coding symbols X5, X6 are either available in the region being completed or else they simply can be copied from the region immediately beneath it.

As for any remaining X coding symbols that are not part of regions 121 or 123 (none in the present example), we would compute them based on the respective X coding symbols in regions 122 and 124, i.e., by subtracting one from the corresponding X coding symbols in regions 122 and 124, in the present embodiment.

Figure 10D:
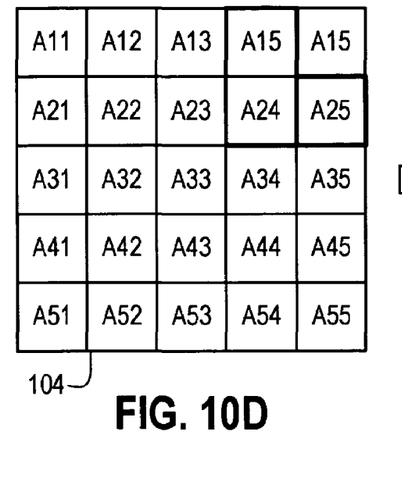
Figure 11D:
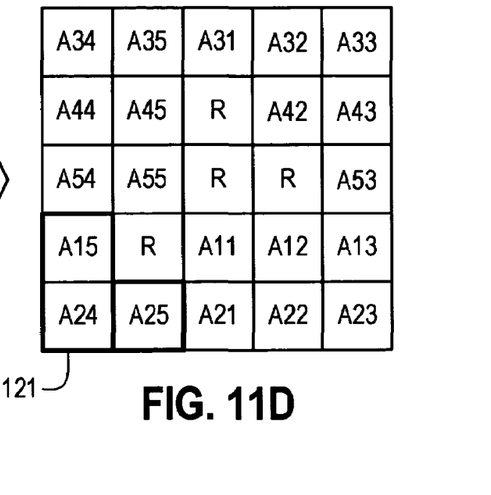

Similarly, referring briefly back to FIG. 9, row (Y) coding symbols in regions 121 and 122 are identical because these two regions are in the same row. Therefore, we can copy the Y coding symbols in region 122 to corresponding locations in region 121. This is illustrated in FIGS. 10D and 11D. Note that the locations of the error-correction coding symbols Y5, Y6 in the bottommost row of each region and the fact that we select the upper left overlapped region to fill in the missing coding symbols together mean that the error-correction coding symbols Y5, Y6 are either available in the region being completed or else they simply can be copied from the region immediately to the right of it. In fact, because Y6 is in the very bottom right corner of each region, it always will be in the region being filled in.

As for any remaining Y coding symbols that are not part of regions 121 or 122 (none in the present example), we would compute them based on the respective Y coding symbols in regions 123 and 124, i.e., by subtracting one from the corresponding Y coding symbols in regions 123 and 124, in the present embodiment.

We now formulate the general solution of how to compute missing digits in a position vector based on the respective digits of the corresponding subsequent position vector (i.e., in the subsequent column or row, as applicable). If we establish a rule of always completing (or reconstructing) the upper left-hand region that is overlapped by the FOV block 104, then any position coding symbol that cannot be simply copied (because a counterpart column coding symbol or row coding symbol does not exist in the same column or row, respectively) can be determined in the following manner.

Denote the smaller position-vector-representing octal number by $X_i = X_{i,J} \ldots X_{i,0}$ and the applicable consecutive position-vector-representing octal number by $X_{i+1} = X_{i+1,J} \ldots X_{i+1,0}$. For each index $j \in \{0, \ldots, J\}$, either $X_{i,j}$ or $X_{i+1,j}$ is available. A method for determining all J digits of $X_i$, where the digits are in an octal basis, is given as follows:

Input. For each index $j \in \{0, \ldots, J\}$, either $X_{i,j}$ or $X_{i+1,j}$ is available in the octal basis.

Output. Two consecutive octal numbers $X_i = X_{i,J} \ldots X_{i,0}$ and $X_{i+1} = X_{i+1,J} \ldots X_{i+1,0}$.

Method: Repeat the following for $j=0, \ldots, J$:

If $X_{i,j-1} \ldots X_{i,0}$ are resolved but $X_{i,j}$ is not available, then:
  if $X_{i,j-1}, \ldots, X_{i,0}$ are all '7' (in particular, if $j=0$) then
    if $X_{i+1,j}=0$, set $X_{i,j}=7$.
    if $X_{i+1,j} \neq 0$, set $X_{i,j}=X_{i+1,j}-1$.
  else $X_{i,j}=X_{i+1,j}$.

For example, if $X_i=5\square3\square\square$ and $X_{i+1}\square0\square20$, then $X_i=50317$ and $X_{i+1}=50320$. A similar method is used to determine the Y position coding symbols missing from the region to be reconstructed. The specific coding pattern suggested in FIG. 4, together with the rule of always reconstructing the upper left-hand overlapped region, collectively ensure that $X_3, X_4$ are always available in the region being reconstructed or can be directly copied from the region immediately beneath it (because they are in the rightmost column of the pattern) and $Y_2, Y_3, Y_4$ are always available in the region being reconstructed or can be directly copied from the region immediately to its right (because they are in the bottommost row of the pattern). At most, therefore, in the present embodiment we need apply the method above to compute $X_2 X_1 X_0$ and $Y_1 Y_0$.

Consider a more general case, where the region size is not necessarily 5×5 or the number of possible coding symbol values is not necessarily 9. The region design preference is that all error-correction coding symbols corresponding to the row number are located in a single row (e.g., at the top or bottom edge of the region), and all error-correction coding symbols corresponding to the column number are located in a single column (e.g., at the left or right edge of the region). This way, the various error-correction coding symbols in a FOV block always correspond to a single row number and a single column number. Whenever the FOV covers parts of different regions, the row and column values that should be computed are those corresponding to the error-correction coding symbols.

In other words, the separation of the error-correction coding symbols (two coding symbols for each codeword in the example above) from the position information coding symbols (five coding symbols for each codeword in the example above), the selection of which region to reconstruct and the selection of where to place the error-correction coding symbols in the encoding pattern together ensure that all of the error-correction coding symbols for the region being reconstructed are present in the field of view, i.e., need only be copied to the correct positions as necessary. By appropriately selecting such region and placement, the FOV block need not be larger than any single region.

In the specific coding pattern suggested in FIG. 4, the row error-correction coding symbols are in the lowest row and the column error-correction coding symbols are in the rightmost column. In an orientation-corrected FOV, the error-correction coding symbols always correspond to the coordinates of the upper left region (e.g., region 121 in FIGS. 7 and 8). This is why our decoding technique completely reconstructs region 121 in the above example.

In the examples given above, the regions are square. However, it should be understood that the present invention is not limited to square regions. The concepts set forth above apply to rectangular regions and to regions of other shapes as well.

Figure 12:
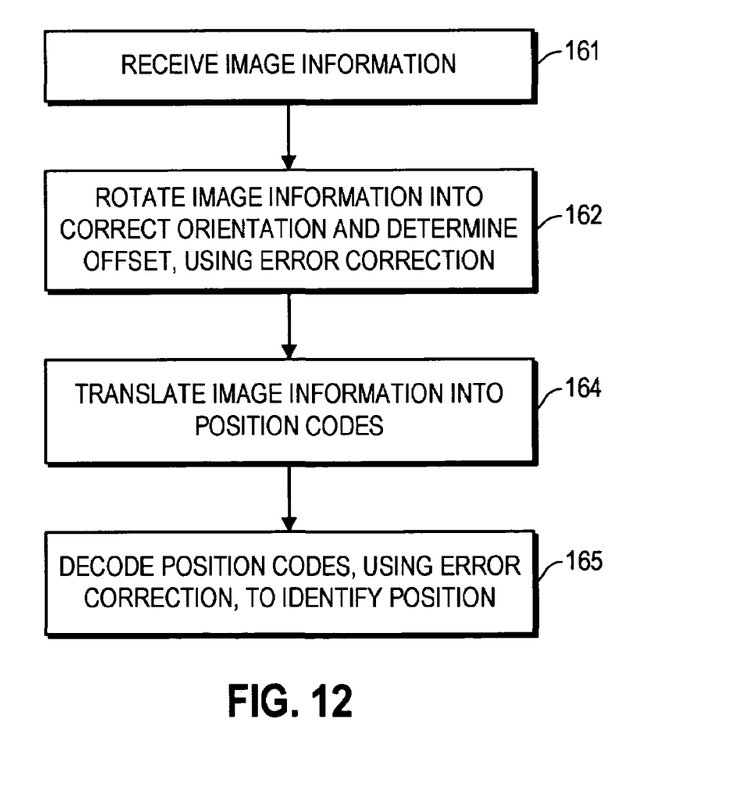
FIG. 12 illustrates a flow diagram for position-location-decoding processing according to a representative embodiment of the present invention.

FIG. 12 illustrates a flow diagram for explaining position-location-decoding processing according to a representative embodiment of the present invention. Initially, in step 161 image information is obtained from a digital pen 35 or other sensor device.

In step 162, the FOV of the image information is rotated into the correct orientation. As discussed above, this step involves identifying the registration coding symbols (which are rotation invariant in the present embodiment). For this purpose, a potential orientation preferably is first determined, e.g., based on the virtual raster lines. Once the coding symbols that have been identified as registration coding symbols are identified, it is possible to create an array corresponding to the FOV block to indicate their positions, e.g., with a "1" indicating where a registration coding symbol has been identified and a "0" in each remaining position. An example, with registration coding symbols 181 and non-registration coding symbols 182, is shown in FIG. 13 for a FOV block 180 in the correct orientation and having no offset.

As noted above, only three registration coding symbols are required to uniquely determine the correct offset and orientation, assuming no errors. In reality, some of the coding symbols identified as registration coding symbols might not in fact be registration coding symbols or a true registration coding symbol might not be identified as such. Such errors may be due to dust, stray markings, etc. It can be shown that the addition of one extra registration coding symbol, e.g., as shown in FIG. 13, can permit the correct identification of orientation and offset even in the presence of one such error.

Figure 13:
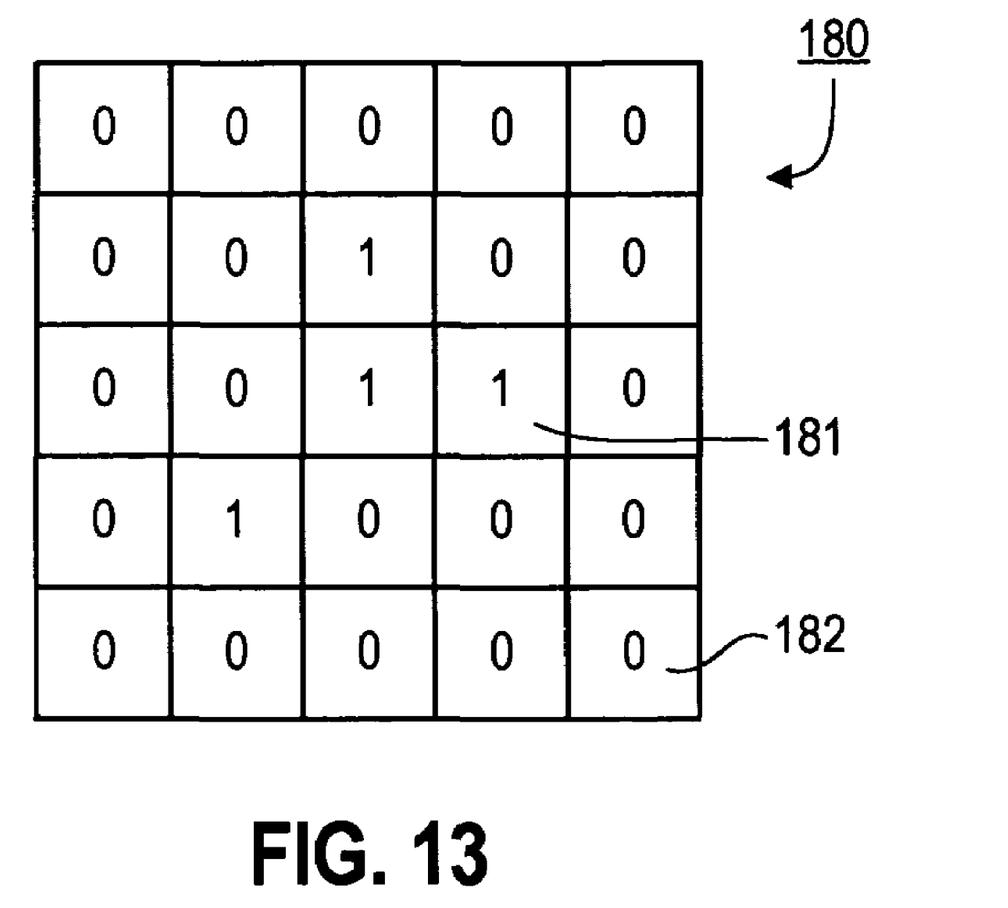
FIG. 13 illustrates a map of the registration coding symbols and non-registration coding symbols for a field-of-view block in the correct orientation and having no offset, according to a representative embodiment of the present invention.

The orientation and offset is determined by comparing the generated map (e.g., as shown in FIG. 13) to maps of all possible orientations and offsets. In the example given above, there are 25 potential offsets (5×5) and, due to the presence of the virtual raster lines, only four potential rotations (0°, 90°, 180°, 270°), meaning a total of 100 possible combinations. The referenced comparisons preferably comprise calculating the Hamming distance (i.e., counting the number of corresponding positions in the two maps whose values differ) between the generated map and the one hundred different potential maps and selecting the potential map (with its corresponding offset and rotation) having the minimum Hamming distance. The foregoing error-correction code used for the registration pattern can be shown, under reasonable assumptions, to reduce the registration-code decoding-error probability by 96.6%.

If there are two or more candidates, or if the distance from the observed pattern to the closest template is considered too high (e.g., 2 or above), then we declare an error in position location because the data is not reliable enough. Assuming a candidate is found, the FOV block is simply rotated as indicated, and its offset relative to the region boundaries (e.g., as shown in FIGS. 7 and 8) is determined.

The technique for identifying rotation and offset described above compares the FOV map to each of the one hundred legal FOV maps. The number of coding symbol comparisons therefore may be 2500. In actual implementation, the following method might be more efficient. Count the number of registration coding symbols in the given FOV. If this number is greater than 5 or smaller than 3, then two or more errors exist in the registration pattern and we avoid decoding.

Otherwise, consider the four registration templates obtained by rotating the centralized registration pattern such as in FIG. 3. Select one registration symbol in the FOV and align it to one of the sixteen possible registration symbol locations of the rotated templates (4 rotations by 4 registration locations in each). A match is obtained if three or four FOV registration codes overlap registration locations in one of the rotated templates. If any of the FOV symbols falls outside of the 5×5 template block, it re-appears on the other side of the same rotated template in a circular manner. If no match is found, examine another FOV registration symbol in a similar manner. If at most one symbol reading error occurred, one of the two examined symbols (or both of them) match a single template. The pattern in FIG. 13 ensures that there is no more than a single match. The number of symbol comparisons required here is at most 25+2*16*4=153. The required rotation corresponds to the template rotation. The shift is found by comparing the location of the selected FOV symbol to the corresponding location in the centralized template.

Returning to FIG. 12, in step 164 the image information is translated into position coding symbols. Assuming that the technique of the '768 Patent has been used, then it is only necessary to identify distances from nominal locations in order to convert the printed symbols (e.g., dots) into the position coding symbols for the FOV block.

Finally, in step 165 the position coding symbols are decoded to identify the position of the digital pen 35 (or other sensor device). As noted above, in order to determine such position, the preferred technique is to first reconstruct the encoding pattern for an entire region. Once that information is known, the position of the region can be read directly and, from it, one can easily calculate the position of the FOV block (based on the offset information) and also the position of the pen tip (based on a known relationship between the tip and the FOV).

The reconstruction of an entire region has been discussed in detail above and, therefore, is not repeated here. The reading of the position information from the position coding symbols would be straightforward in the absence of any detection errors. On the assumption that errors might exist, the following discussion describes how to construct the error-correction coding symbols and how to decode the resulting position coding symbols in a manner that yields the correct result even in the presence of certain errors. In the preferred embodiments of the invention, a Reed-Solomon encoding/decoding technique is used.

In its general form, a Reed-Solomon technique encodes a block's message as points in a polynomial plotted over a finite field. The coefficients of the polynomial are the data values of the block. The plot over-determines the coefficients, which can then be recovered from subsets of the plotted points. In the same sense that one can correct a curve by interpolating past a gap, a Reed-Solomon code can bridge one or more errors in a block of data to recover the coefficients of the polynomial that drew the original curve.

In the example set forth above, the information coding symbols take their values from an alphabet of size eight. We therefore choose to work with an error-correction coding symbol over the finite field of size eight, denoted GF(8). The field definition is given below. Although we use the symbols $\{0, \ldots, 7\}$ both as octal digits and as field elements, we distinguish between octal arithmetic and field arithmetic. In the octal arithmetic, for example, 5+1=6, while the addition rule in GF(8) implies 101+001=100. We use the octal arithmetic to determine the information coding symbols $N_0, \ldots, N_4, X_0, \ldots, X_4,$ and $Y_0, \ldots, Y_4$. The GF(8) arithmetic is used to determine the parity (or error-correction) coding symbols $N_5, N_6, X_5, X_6,$ and $Y_5, Y_6$. Those are computed based on a technique described below. While decoding, we again use the GF(8) arithmetic to recover information and error-correction coding symbols.

We encode the position data in three different and independent codewords. The codewords however belong to the same code structure—a [7, 5, 3] Reed-Solomon code over GF(8). The code length is 7, the code dimension is 5, and the minimum Hamming distance is 3. Each codeword thus consists of seven coding symbols: five information (or message) coding symbols (either $N_0, \ldots, N_4, X_0, \ldots, X_4,$ or $Y_0, \ldots, Y_4$) and two parity (or error-correction) coding symbols ($N_5, N_6$, or $X_5, X_6$, or $Y_5, Y_6$, respectively). The minimum distance 3 is the largest possible distance given the code's length and dimension. We select the systematic [7, 5, 3] Reed-Solomon code with the generator polynomial:

$$g(x)=(x-1)(x-\alpha)=x^2+\alpha^3 x+\alpha,$$

with $\alpha$ being a primitive element of GF(8).

After resolving all symbols of a single region on the page 10 (e.g., using the procedure described above), we apply a Reed-Solomon decoding technique in order to correct the errors that may be present. We decode each of the three codewords independently using the decoding technique specified below.

The Reed-Solomon code in the present embodiment has a minimum Hamming distance of 3, and it therefore allows the correction of any single error in a codeword. The correctable error patterns in the region therefore include all patterns with one to three defective coding symbols, as long as no two errors fall in the same codeword.

Note that there are cases where error patterns of weight 2 or more convert the original codeword into another codeword or into a vector at Hamming distance 1 from a codeword. In those cases the decoding technique may yield the wrong codeword. The probability of such cases is however much smaller than the probability of receiving the original codeword with either no errors or a single error. More specifically, with reasonable assumptions, it can be shown that such error correction reduces the probability of an error by 98.69% if a single complete region is captured in the FOV, or by at least 95% in the more general case.

Working with a field (instead of just a set of elements) allows arithmetic operations between the elements. The field is closed under addition and multiplication, and these two operations are commutative and associative (a distributive law applies as well). The field has two special elements denoted 0 and 1. Every field element $\alpha$ has an additive inverse ($\alpha+(-\alpha)=0$), and every element except 0 also has a multiplicative inverse ($\alpha \times \alpha^{-1}=1$).

All finite fields of eight elements are isomorphic to each other. The Galois field of size 8, denoted GF(8), is thus considered unique. There are two common notations for the eight field elements. The first notation uses binary vectors of length three. This notation makes element addition very easy to calculate since it is a simple vector addition over GF(2) (e.g., 001+101=100). The second notation uses powers of a primitive element $\alpha$ that generates the multiplicative group of the field. The field elements are thus denoted $\{0, 1=\alpha^0, \alpha=\alpha^1, \alpha^2, \alpha^3, \alpha^4, \alpha^5, \alpha^6\}$. This notation allows a simple multiplication of elements: to multiply nonzero elements, add their powers and take the sum modulo 7.

The binary vector representation corresponds to a linear combination of the field elements 1, $\alpha$ and $\alpha^2$, where $\alpha$ is the root of the primitive polynomial $x^3+x+1=0$. Every field element can be described by such a linear combination. For example, $\alpha^3=-\alpha-1=\alpha+1$ (note that $-x=x$ over GF(2)). The binary vector which describes the respective linear combination is 011. It is possible to define the field GF(8) using another primitive polynomial, $x^3+x^2+1=0$. A different table is then used to connect between the two element representations. The resulting field is however isomorphic to the one defined above.

Given the code parameters and the generator polynomial set forth above, the encoding rule is as follows:
1. Denote the five message symbols by $m_4 m_3 m_2 m_1 m_0$. Define the message polynomial as $m(x)=m_4 x^4+m_3 x^3+m_2 x^2+m_1 x+m_0$.
2. Divide $x^2 \cdot m(x)$ by the generator polynomial $g(x)$. Let $p(x)=p_1 x+p_0$ be the remainder polynomial.
3. The output codeword is $(c_6, c_5, c_4, c_3, c_2, c_1, c_0)=(m_4, m_3, m_2, m_1, m_0, p_1, p_0)$.

The above encoding rule implies that the code is the set of all vectors $\bar{c}=c6, c5, c4, c3, c2, c1, c0)$, for which the field elements 1 and $\alpha$ are roots of the corresponding polynomial $$c(x) = \sum_{i=0}^{6} c_i x^i = x^2 m(x) + p(x).$$

The vectors $\bar{c}$ satisfying the above are referred to as codewords. This code is a linear subspace over the finite field GF(8). The subspace dimension is 5.

It is noted that the indices in the codeword components (i.e., the coding symbols) do not coincide with the code indices above. In particular, the parity coding symbols $N_5, N_6$ (or $X_5, X_6$, or $Y_5, Y_6$) correspond to $c_1, c_0$.

Suppose that the region contains a correctable error pattern. Let $\bar{v}=(v_6, v_5, v_4, v_3, v_2, v_1, v_0)$ be associated with one of the N, X or Y vectors, as captured by the detection device. The decoding algorithm specified below finds the original codeword if $\bar{v}$ is either the original codeword or a linear combination $\bar{v}=\bar{c}+\bar{e}$ of the original codeword $\bar{c}$ and an error vector $\bar{e}$ of Hamming weight 1.

Input: A vector $\bar{v}=(v_0, \ldots, v_6)$ over GF(8).

Output: A codeword $\bar{c}=(c_0, \ldots, c_6) \in C$ at Hamming distance $\leq 1$ from $\bar{v}$, if there exists such a codeword.

Method:

Evaluate the polynomial $$v(x) = \sum_{i=0}^{6} v_i x^i$$

at the field elements 1 and $\alpha$.
1. If $v(1)=v(a)=0$, return $\bar{v}$.
2. If $v(1) \neq 0$ and $v(\alpha) \neq 0$, find $j \in \{0, \ldots, 6\}$ for which $\alpha^j=v(\alpha)/v(1)$.
   Obtain $\bar{c}$ from $\bar{v}$ by subtracting the value $v(1)$ from the jth component $v_j$.
3. If $v(1)=0$ but $v(\alpha) \neq 0$, or if $v(1) \neq 0$ but $v(\alpha)=0$, then do not return any codeword.

In case 1 of FIG. 6, $\bar{v}$ is a codeword, so we do not modify any of its coding symbols. In case 2, the modification of the jth component gives the only codeword at Hamming distance 1 from the input vector $\bar{v}$. In case 3, $\bar{v}$ is at Hamming distance 2 or more than any codeword in C. The decoding technique does not specify any correction in such cases, which are considered uncorrectable.

The encoding pattern described above permits a floating determination of position. In other words, any position can be resolved from any FOV having the same size as a single region, and not only from FOVs containing a complete region. At the same time, the pattern provides a certain amount of protection against coding symbol detection errors.

In certain cases, it is desirable to eliminate repeating patterns in the printed symbols. To achieve this goal, in one an alternate embodiment of the invention, the various regions are organized such that symbols holding the row (column) number are not concentrated in two rows (columns), e.g., not in neighboring rows (columns).

Other embodiments attempt to cancel the repetitiveness of the page number. To achieve this, we replace each of the page numbers according to a pseudo-random permutation of $A_9$ elements. If different permutations are selected for adjacent regions and for relatively close regions, then the division between region rows or columns should be less distinguishable to the naked eye.

For decoding purposes, it should be possible to easily determine the mapping used for each coding symbol in a given FOV. We therefore select the region permutation based on the row and column values written in this region. While decoding, we decode the row and column numbers before decoding the page number. This cancels the independence we previously had between the decoding processes of the three different region codewords. A decoding error in the row or column numbers would typically imply an erroneous page number.

We suggest the following specific technique for defining the permutation for every region. Randomly generate some fixed number n of permutations and keep the permutations in a table. Preferably, the number n is a prime number close to the number of regions per row or column, the greatest of which. For an A4 page, we use n=251. Given a region at row r and column c, we take the permutation at index $$i = p_1^r p_2^c \bmod n,$$

where $p_1$ and $p_2$ are two small prime numbers, say 2 and 3. Since $p_1$ and $p_2$ do not divide n, the rectangular grid effect should be reduced. Since the index i is not a function of r+c or r−c, a diagonal effect should not be created either.

System Environment.

Generally speaking, nearly all of the methods and techniques described herein can be practiced with the use of a general-purpose computer system. Such a computer typically will include, for example, at least some of the following components interconnected with each other, e.g., via a common bus: one or more central processing units (CPUs), read-only memory (ROM), random access memory (RAM), input/output software or circuitry for interfacing with other devices and for connecting to one or more networks (which in turn, in many embodiments of the invention, connect to the Internet or to any other networks), a display (such as a cathode ray tube display, a liquid crystal display, an organic light-emitting display, a polymeric light-emitting display or any other thin-film display), other output devices (such as one or more speakers, a headphone set or a printer), one or more input devices (such as a mouse, touchpad, tablet, touch-sensitive display or other pointing device; a keyboard, a microphone or a scanner), a mass storage unit (such as a hard disk drive), a real-time clock, a removable storage read/write device (such as for reading from or writing to RAM, a magnetic disk, a magnetic tape, an opto-magnetic disk, an optical disk, or the like), and a modem (which also preferably connect to the Internet or to any other computer network via a dial-up connection). In operation, the process steps to implement the above methods, to the extent performed by such a general-purpose computer, typically initially will be stored in mass storage (e.g., the hard disk), are downloaded into RAM and then executed by the CPU out of RAM.

Suitable computers for use in implementing the present invention may be obtained from various vendors. Various types of computers, however, may be used depending upon the size and complexity of the tasks. Suitable computers include mainframe computers, multiprocessor computers, workstations, personal computers, and even smaller computers such as PDAs, wireless telephones or any other appliance or device, whether stand-alone, hard-wired into a network or wirelessly connected to a network. In addition, although a general-purpose computer system has been described above, in alternate embodiments a special-purpose computer instead (or in addition) is used. In particular, any of the functionality described above can be implemented in software, hardware, firmware or any combination of these, with the particular implementation being selected based on known engineering tradeoffs. In this regard, it is noted that the functionality described above primarily is implemented through fixed logical steps and therefore can be accomplished through programming (e.g., software or firmware), an appropriate arrangement of logic components (hardware) or any combination of the two, as is well-known in the art.

It should be understood that the present invention also relates to machine-readable media on which are stored program instructions for performing the methods of this invention. Such media include, by way of example, magnetic disks, magnetic tape, optically readable media such as CD ROMs and DVD ROMs, semiconductor memory such as PCMCIA cards, etc. In each case, the medium may take the form of a portable item such as a small disk, diskette, cassette, etc., or it may take the form of a relatively larger or immobile item such as a hard disk drive, ROM or RAM provided in a computer.

The foregoing description primarily emphasizes electronic computers. However, it should be understood that any other type of computer instead may be used, such as a computer utilizing any combination of electronic, optical, biological or chemical processing.

Additional Considerations.

Although the present invention primarily is described above in connection with locating the position of a digital pen on a sheet of marked paper, it should be understood that the invention is applicable to other position-location problems as well. For example, another application is in locating the position of a digital mouse with high resolution on a mouse pad that has been encoded with position-information in accordance with the present invention.

Several different embodiments of the present invention are described above, with each such embodiment described as including certain features. However, it is intended that the features described in connection with the discussion of any single embodiment are not limited to that embodiment but may be included or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of identifying a position on a surface, comprising:

receiving image information from a sensor placed near a physical surface, the surface having been encoded with position information in each of plural different regions, each said region including position coding symbols to identify its own location and error-correction coding symbols for said position coding symbols;

translating the image information into a pattern of coding symbols belonging to parts of at least two of said plural different regions;

identifying the position coding symbols and error-correction coding symbols for a selected one of the plural different regions based on the parts of said at least two of said plural different regions; and decoding the position coding symbols and error-correction coding symbols for the selected one of the plural different regions into a position indicator by using an error-correction technique.

2. A method according to claim 1, wherein the position coding symbols for the selected one of the plural different regions include a row number indicator and a column number indicator.

3. A method according to claim 2, wherein the error-correction coding symbols for the selected one of the plural different regions include an error-correction coding symbol for the row number indicator and an error-correction coding symbol for the column number indicator.

4. A method according to claim 1, further comprising a step of identifying a correct orientation of the image information based on registration coding symbols within the image information.

5. A method according to claim 4, further comprising a step of rotating the image information into the correct orientation prior to the translating step.

6. A method according to claim 4, wherein the registration coding symbols include at least one redundant coding symbol, permitting identification of the correct orientation even if one of the registration coding symbols is missed or is detected in error.

7. A method according to claim 1, wherein the image information comprises a pattern of printed marks and the coding symbols are identified based on intermediate grid locations within a fixed grid of marks.

8. A method according to claim 1, wherein the error-correction coding symbols comprise Reed-Solomon coding symbols.

9. A method according to claim 1, wherein the position coding symbols and error-correction coding symbols for the selected one of the plural different regions are decoded into the position indicator from a set of possible position indicators by finding the possible position indicator that corresponds to a minimum distance, according to a specified distance metric, from the plurality of position coding symbols and error-correction coding symbols.

10. A method according to claim 9, wherein the specified distance metric comprises a Hamming distance.

11. A method according to claim 1, wherein the plural different regions are contiguous and non-overlapping.

12. A method according to claim 1, wherein a field of view corresponding to the image information is at most only slightly larger than a single one of the plural different regions.

13. A method according to claim 1, wherein selection of the selected one of the plural different regions and placement of the error-correction coding symbols in each of the plural different regions ensure that all of the error-correction coding symbols for the one of the plural different regions are present in each possible field of view corresponding to the image information for fields of view that do not encompass any complete one of the plural different regions.

14. A method according to claim 1, wherein at least one of the error-correction coding symbols is read directly from a part of one of said at least two of said plural different regions.

15. A computer-readable medium storing computer-executable process steps for identifying a position on a surface, said process steps comprising:

receiving image information from a sensor placed near a physical surface, the surface having been encoded with position information in each of plural different regions, each said region including position coding symbols to identify its own location and error-correction coding symbols for said position coding symbols;

translating the image information into a pattern of coding symbols belonging to parts of at least two of said plural different regions;

identifying the position coding symbols and error-correction coding symbols for a selected one of the plural different regions based on the parts of said at least two of said plural different regions; and decoding the position coding symbols and error-correction coding symbols for the selected one of the plural different regions into a position indicator by using an error-correction technique.

16. A computer-readable medium according to claim 15, wherein the position coding symbols for the selected one of the plural different regions include a row number indicator and a column number indicator, and wherein the error-correction coding symbols for the selected one of the plural different regions include an error-correction coding symbol for the row number indicator and an error-correction coding symbol for the column number indicator.

17. A computer-readable medium according to claim 15, wherein the plural different regions are contiguous and non-overlapping.

18. A computer-readable medium according to claim 15, wherein a field of view corresponding to the image information is at most only slightly larger than a single one of the plural different regions.

19. A computer-readable medium according to claim 15, wherein at least one of the error-correction coding symbols is read directly from a part of one of said at least two of said plural different regions.

20. An apparatus for identifying a position on a surface, said process steps comprising:
  means for receiving image information from a sensor placed near a physical surface, the surface having been encoded with position information in each of plural different regions, each said region including position coding symbols to identify its own location and error-correction coding symbols for said position coding symbols;
  means for translating the image information into a pattern of coding symbols belonging to parts of at least two of said plural different regions;
  means for identifying the position coding symbols and error-correction coding symbols for a selected one of the plural different regions based on the parts of said at least two of said plural different regions; and
  means for decoding the position coding symbols and error-correction coding symbols for the selected one of the plural different regions into a position indicator by using an error-correction technique.

* * * * *